United States Patent Office 3,510,509
Patented May 5, 1970

3,510,509
N-AROMATIC METHYL ITACONAMATES
Ralph P. Neighbors, Olathe, Kans., assignor, by mesne assignments, to Gulf Oil Corporation, Pittsburgh, Pa., a corporation of Pennsylvania
No Drawing. Original application Nov. 13, 1963, Ser. No. 323,255, now Patent No. 3,375,158, dated Mar. 26, 1968. Divided and this application Oct. 3, 1966, Ser. No. 598,135
Int. Cl. C07c *101/44*
U.S. Cl. 260—471                                   11 Claims

ABSTRACT OF THE DISCLOSURE

Methyl 3-methylenesuccinanilate, the correspnding N-naphthyl itaconamic ester and similar compounds with chloro, nitro, methyl or methoxy substituents on the aromatic ring have low toxicity to plant and animal life, but are effective as soil fungicides. The compounds are solids with melting points ranging between about 50° and 130° C. Liquid itaconamic esters of similar structure are disclosed which lack the properties necessary for use as soil fungicides.

---

This application is a division of U.S. Ser. No. 323,255, Nov. 13, 1963, now U.S. Pat. 3,375,158.

DESCRIPTION OF THE INVENTION

The itaconamic esters of this invention have pronounced fungicidal activity. Moreover, they possess a unique combination of properties which make them suitable for use as agricultural fungicides, particularly for application to foliage, protection of proteinaceous and cellulosic materials such as canvas tarpaulins, burlap bags and leather goods, for treatment of seeds and treatment of soil. Besides fungicidal activity the compositions of this invention possess other properties which contribute greatly to their utility in agricultural applications. For instance, these compositions have relatively low toxicity to warm-blooded animals and to green plants. They contain no heavy metals and cause no accumulation of toxic substances in the soil. Perhaps the most unusual characteristic of the compositions of this invention, considering their high level of toxicity to fungi, is the almost complete absence of pre-emergence herbicidal effect. It is this rare combination of properties which makes the itaconamic esters of this invention useful as soil fungicides.

The nature of the N-substituent group is a critical factor in conferring the combination of fungicidal activity and low herbicidal effect on the itaconamic esters. Although substituent groups on the aromatic nucleus may prolong the fungicidal effect, they do not appear to improve the performance of the esters as soil fungicides to an economically significant degree, and in some instances may contribute side effects which interfere with seed germination. Interestingly, nonaromatic N—Ar structures of approximately the same molecular dimensions and general reactivity appear to detract from the properties which are desirable in soil fungicides.

The nature of the R group in the ester portion of the chemical formula appears to be somewhat critical with regard to herbicidal and fungicidal effects. Methyl esters are preferred because, in general, these esters exhibit the greatest fungicidal effect per unit weight of substances. Ethyl and propyl esters may be used, though they offer no substantial advantages. The higher straight chain esters have been found to yield inferior results when tested for control of soil fungi.

In order to obtain uniform distribution of the highly active fungicides of this invention, it is preferred to form an intimate mixture of the active ingredient with at least one substance selected from inert, finely divided solids, emulsifying and dispersing agents and hydrocarbons. A formulation may be made, for example, by dispersing the active ingredient in and on a clay, talc, chalk or other inert solid and applying the formulation as a dust. A dispersing agent may also be distributed on the dust if desired, so as to obtain a wettable powder. An emulsifiable concentrate may be prepared by dissolving the active ingredient in a hydrocarbon solvent, in combination with an emulsifier.

When controlling fungi according to the processes of this invention, the itaconamic ester compound is applied to the locus of fungus attack in a fungicidally effective amount, preferably in a low concentration in combination with an inert solid, water or other diluent, so as to assure even distribution. Soil may be treated to a depth sufficient to protect seeds and sprouts by direct mixing with the soil by mechanical working at the surface. In the treatment of irrigated soils, an emulsifiable concentrate may be metered into irrigation water. In treatment of greenhouse soil it is convenient to use a formulation of itaconamic ester with an inert finely divided solid, and mix the formulation with the soil before putting in pots or flats. Tarpaulins or burlap bags which are likely to be placed in contact with damp ground may be protected from fungus attack by impregnating the fabric with a liquid dispersion or solution of one or more of the itaconamic esters of this invention. For treatment of leather, itaconamate ester in solution in a hydrocarbon solvent may be preferred.

Plant foliage may be protected by application in the form of dust or spray formulations. A preferred method of application is by metering emulsifiable concentrate into the water stream of sprinkler irrigation systems, so that damp foliage is afforded protection, while the bulk of the fungicide is used to treat the soil. Both spray volume and concentration of fungicide must necessarily be adjusted to the porosity and water-holding capacity of the soil.

Fungicidal compositions of this invention may contain other fungicidal compounds, bactericides and insecticides, as is usual in pest control compositions.

In order that the invention may be better understood, reference should be had to the following illustrative examples:

Example 1

A mixture of aniline (0.1 mole, 9.3 g.), pyridine (0.1 mole, 7.9 g.) and benzene (150 ml.) was stirred and cooled to 15° C.

2-carbomethoxymethylacrylyl chloride (0.1 mole, 16.2 g.) was added dropwise at 15–25° C. The resultant mixture was stirred 2 hours after addition was complete. Water (100 ml.) was added and stirring was continued for 15 min. The benzene layer was separated, dried over magnesium sulfate and diluted with hexane (600 ml.) to precipitate the crude product. Recrystallization from a mixture of benzene and hexane gave 16.5 g. of product (75% yield; M.P. 59–60° C.).

*Analysis.*—Calc'd for $C_{12}H_{13}NO_3$ (percent): C, 65.74;

H, 5.97; N, 6.39. Found (percent): C, 65.83; H, 5.88; N, 6.12.

The product was concluded to be an itaconamic ester of the following structure:

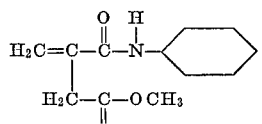

(Methyl 3-methylenesuccinanilate)

Examples 2–16

Itaconamic esters having the structures and physical properties as shown below were made according to the general procedure of Example 1.

(2) 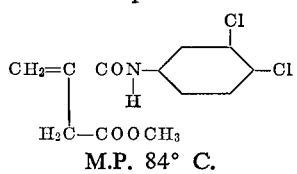
M.P. 84° C.

(3) 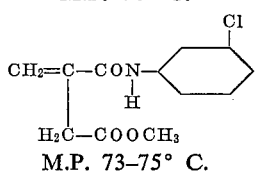
M.P. 73–75° C.

(4) 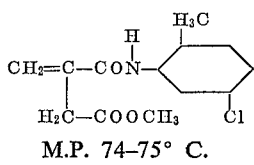
M.P. 74–75° C.

(5) 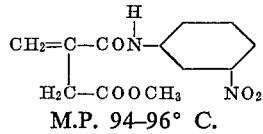
M.P. 94–96° C.

(6) 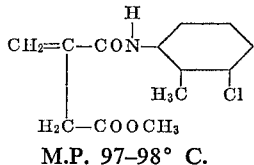
M.P. 97–98° C.

(7) 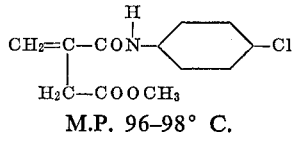
M.P. 96–98° C.

(8) 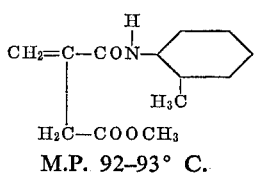
M.P. 92–93° C.

(9) 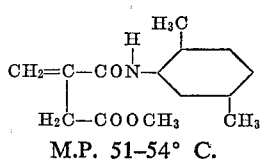
M.P. 51–54° C.

(10) 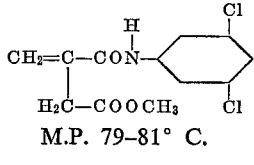
M.P. 79–81° C.

(11) 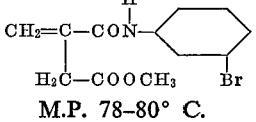
M.P. 78–80° C.

(12) 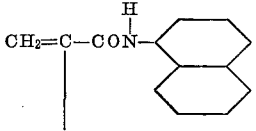
M.P. 84–86° C.

(13) 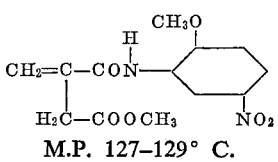
M.P. 127–129° C.

(14) 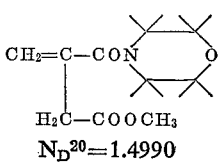
$N_D^{20} = 1.4990$

(15) 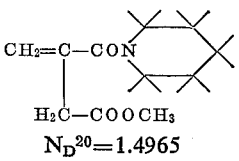
$N_D^{20} = 1.4965$

(16) 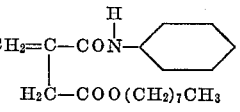
$N_D^{20} = 1.5188$

The compounds were screened for fungicidal activity at the application rate of 100 lb./acre by the following method:

Soil highly infested with seed and root-rotting organisms is mixed with the test chemical in a Patterson-Kelley blender. The mixture of soil and fungicide is poured into waxed paper cartons peas are planted in the mixture, water is added and the temperature is maintained at 65° F. The results are rated according to percent germination and number of healthy plants obtained, as follows:

0/– —No plants, seed rotted.
1/1—2–3 healthy plants, 25% germination.
4/4—9–10 healthy plants, 100% germination.

Results are tabulated below.

| Example No. | Rating, Fungicidal Activity/Germination |
|---|---|
| 1 | 4/4 |
| 2 | 3/4 |
| 3 | 4/4 |
| 4 | 4/4 |
| 5 | 4/4 |
| 6 | 4/2 |
| 7 | 4/3 |
| 8 | 4/4 |
| 9 | 4/3 |
| 10 | 2/4 |
| 11 | 3/4 |
| 12 | 4/4 |
| 13 | 3/4 |
| 14 | 0/– |
| 15 | 0/1 |
| 16 | 0/– |

In control experiments which received no treatment, the seeds rotted.

All of the compounds illustrated are itaconamic esters. However, according to accepted rules of nomenclature, some of these compounds would be named as substituted 3-methylenesuccinanilic esters, some as 3-methylenesuccinamic esters, some as substituted 3-butenoic esters. Structural formulas are employed herein to avoid confusion which might result from diversity of nomenclature of these structurally similar compounds.

What is claimed is:

1. An itaconamic ester of the formula

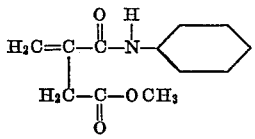

2. An itaconamic ester of the formula

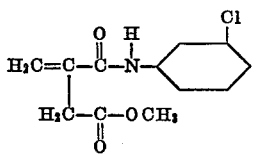

3. An itaconamic ester of the formula

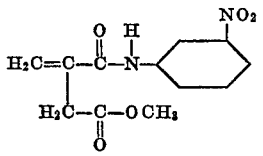

4. An itaconamic ester of the formula

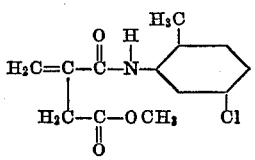

5. An itaconamic ester of the formula

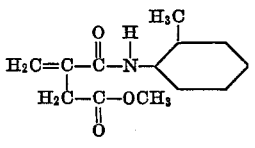

6. An itaconamic ester of the formula

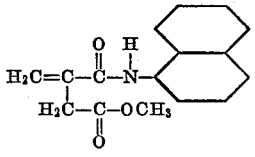

7. An itaconamic ester of the formula

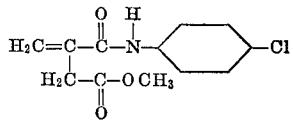

8. An itaconamic ester of the formula

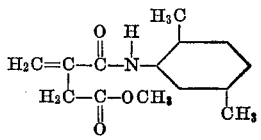

9. An itaconamic ester of the formula

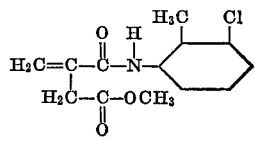

10. An itaconamic ester of the formula

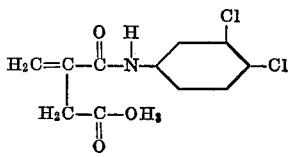

11. An itaconamic ester of the formula

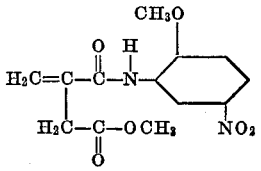

References Cited

Riddell et al., Chemical Abstracts, vol. 58 (1963), p. 4431D to 4431E relied on.

LORRAINE A. WEINBERGER, Primary Examiner

L. A. THAXTON, Assistant Examiner

U.S. Cl. X.R.

260—247.2, 294.3; 424—309, 248, 267